Figure 1:
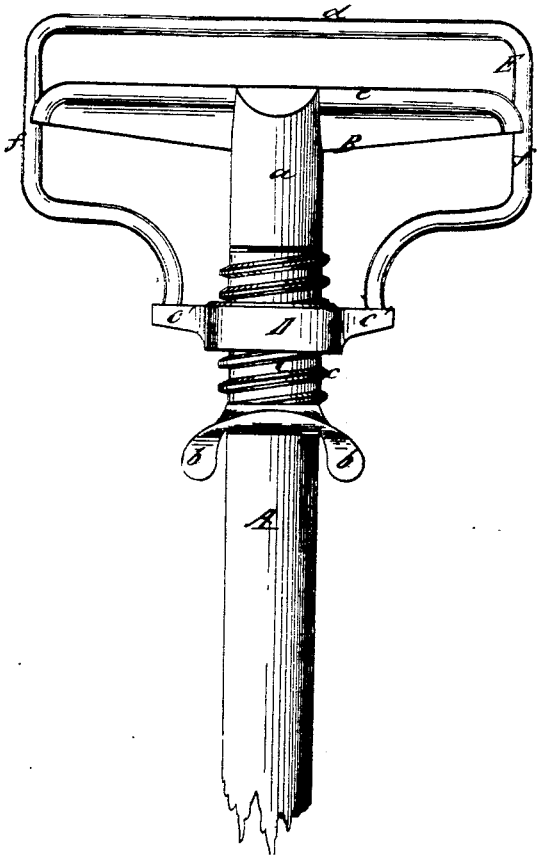
Figure 2:
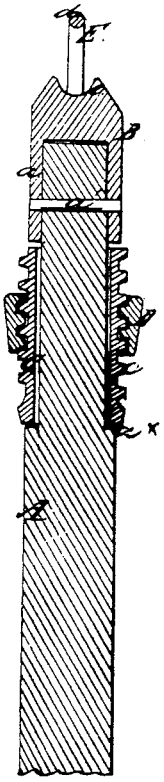

15. BRUSHING, SCRUBBING,
& GENERAL CLEANING.

153

EXAMINER

4

L. Taylor.

Mop Head.

No. 3,682. Reissued Oct. 19, 1869.

Witnesses
Sam'l W Porter
David A Smith

Inventor
Luke Taylor

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # Re 3682 FOR ISSUE DATE 10-19-1869

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa